United States Patent [19]
Memering et al.

[11] 4,215,035
[45] Jul. 29, 1980

[54] THERMALLY STABLE SULFUR DIOXIDE-ETHYLENE-VINYL ESTER TERPOLYMERS AND PROCESS FOR PREPARING SAME

[75] Inventors: Leroy J. Memering; Lorrin W. Pyle, both of Cincinnati, Ohio

[73] Assignee: National Distillers and Chemical Corporation, New York, N.Y.

[21] Appl. No.: 28,958

[22] Filed: Apr. 11, 1979

[51] Int. Cl.$^2$ .......................... C08K 5/36; C08K 3/34; C08K 3/26; C08K 3/24
[52] U.S. Cl. ...................... 260/45.75 W; 260/45.7 R; 260/45.95 C; 260/45.95 R; 260/42.52
[58] Field of Search ................ 260/45.7 SW, 45.75 R, 260/42.52, 23 AR, 45.95 R, 45.95 C; 528/364

[56] References Cited

U.S. PATENT DOCUMENTS

| | | | |
|---|---|---|---|
| 2,146,276 | 2/1939 | Wilder | 528/364 |
| 2,578,653 | 12/1951 | Goppel et al. | 260/45.9 R |
| 2,779,749 | 1/1957 | Wicklatz | 528/364 |
| 3,684,778 | 8/1972 | Hammer | 528/364 |
| 4,017,450 | 4/1977 | Bailey | 260/37 R |
| 4,071,509 | 1/1978 | Edmonds | 260/45.7 R |

Primary Examiner—V. P. Hoke
Attorney, Agent, or Firm—Kenneth D. Tremain

[57] ABSTRACT

Sulfur dioxide-ethylene-vinyl ester terpolymers exhibiting improved thermal stability are prepared by substantially uniformly incorporating therein a thermal stability-imparting amount of at least one inorganic oxygen-containing metal compound in which the metal is an alkali metal, alkaline earth metal or zinc.

20 Claims, No Drawings

THERMALLY STABLE SULFUR DIOXIDE-ETHYLENE-VINYL ESTER TERPOLYMERS AND PROCESS FOR PREPARING SAME

BACKGROUND OF THE INVENTION

1. Field of the Invention

This invention relates to the field of sulfur dioxide-ethylene-vinyl ester terpolymers, and more particularly, to such terpolymers exhibiting improved thermal stability.

2. Description of the Prior Art

Due to their long, flexible hydrocarbon chains, polyethylenes inherently possess good low temperature behavior, impact resistance, etc., but the very low polarity of these thermoplastics makes them susceptible to attack by such materials as hot hydrocarbon solvents and hot oils. The more polar vinyl ester monomers when copolymerized with ethylene provide resins having improved adhesion to polar substrates and greater resistance to solvents and oils but also result in a diminution of the advantageous properties characteristic of the ethylene homopolymers.

It has been observed that the random introduction of sulfur dioxide into the chain of an ethylene-vinyl ester copolymer increases the polarity of the resin without significantly affecting other physical properties such as stiffness, tensile strength and softening temperature. Thus, U.S. Pat. No. 3,684,778 describes random terpolymers prepared from sulfur dioxide, ethylene and vinyl esters and blends of the terpolymers with other polymers. The terpolymers, which can be blended with antioxidants, ultra-violet light stabilizers, stabilizers, and pigments, can be used for making self-supporting film, cable jacketing and conduit as well as many polyethylene applications.

To date, however, thermal instability of these and other sulfur dioxide-ethylene-vinyl ester terpolymers, often marked by an objectionable odor and a tendency to discoloration, has been a serious obstacle to the wider acceptance and use of these resins. While ethylene-vinyl ester copolymers have a sweet odor owing to the presence of residual unpolymerized vinyl ester, the sulfur dioxide-ethylene-vinyl ester terpolymers possess sulfurous and acetic acid odors which become more pronounced on storage in confined areas at ambient temperature. It has been suggested that sulfinic acid end groups forming during polymerization cause the deacetylation of vinyl acetate groups thereby releasing acetic acid and forming double bonds. The presence of double bonds in the terpolymers makes them prone to undesirable crosslinking and/or discoloration. Sulfur dioxide-ethylene-vinyl ester terpolymers on extended aging at 300° F. turned nearly black in color which became more serious as their sulfur dioxide content increased. Since solvent and oil resistance are optimized at higher sulfur dioxide levels, such aggravated discoloration poses a considerable problem.

SUMMARY OF THE INVENTION

It has now been surprisingly discovered that the thermal stability of sulfur dioxide-ethylene-vinyl ester terpolymers can be substantially improved by substantially uniformly incorporating therein an effective amount of at least one inorganic oxygen-containing metal compound in which the metal is selected from the group consisting of alkali metal, alkaline earth metal and zinc.

Still further improvement in thermal stability can often be achieved by blending the base terpolymer with a combination of the aforesaid metal compounds and known antioxidants. The improved thermal stability of the terpolymers of this invention is accompanied by a marked decrease in objectionable odor and discoloration and as such, opens up areas of application from which the base resins have heretofore been excluded.

DESCRIPTION OF THE PREFERRED EMBODIMENTS

Among the vinyl esters which can be used in the preparation of the base terpolymers of this invention are included one or more of the following: vinyl formate, vinyl acetate, vinyl propionate, vinyl butyrate, vinyl stearate, and the like. Vinyl acetate is especially preferred due to its low cost and ready availability. Up to about twenty weight percent of the base terpolymers, not to exceed the weight amount of the vinyl ester component, can be derived from one or more other ethylenically unsaturated monomers copolymerizable with sulfur dioxide and ethylene. Typical examples of such monomers are alpha-olefins of three to 12 carbon atoms such as propylene, butenes, pentenes, hexenes, heptenes, octenes, and decenes; unsaturated mono- and dicarboxylic acids such as acrylic acid, methacrylic acid, crotonic acid, maleic acid, fumaric acid, itaconic acid and the dicarboxylic acids in which one, or both, of the carboxyl groups has been esterified with alkanols, preferably of one to eight carbon atoms or amidized to contain the NR group wherein R is hydrogen, alkyl of one to eight carbon atoms and cyclic alkyl such as methyl hydrogen maleate and dibutyl maleate; esters of unsaturated carboxylic acids such as the alkyl acrylates and methacrylates wherein the alkyl groups is one to 18 carbon atoms, i.e., methyl acrylate and methacrylate, ethyl acrylate and methacrylate, 2-ethylhexyl acrylate and methacrylate, stearyl acrylate and methacrylate, and amino alkyl acrylates and methacrylates, i.e., dimethyl aminoethyl acrylate and methacrylate, diethyl aminoethyl methacrylate, dimethyl aminopropyl acrylate or methacrylate and t-butyl aminoethyl acrylate or methacrylate; N-vinyl amides such as N-vinyl pyrrolidone and N-vinyl-N-methyl formamide; vinyl halides such as vinyl chloride and vinyl fluoride; vinylidene halides such as vinylidene chloride; vinyl alkyl ethers where alkyl is one to eight carbons such as methyl vinyl ether, n-butyl vinyl ether isobutyl vinyl ether; acrylonitrile and methacrylonitrile; epoxy and hydroxy substituted vinyl alkyl ethers or hydroxy substituted esters of unsaturated mono- or dicarboxylic acids such as hydroxyoctyl acrylate, hydroxyethyl methacrylate, hydroxypropyl methacrylate, hydroxybutylvinyl ether and glycidyl methacrylate; and vinyl aromatics such as styrene, vinyl naphthalene, alkyl (one to eight carbons) and halogen substituted styrene and vinyl naphthalene such as o-methyl styrene, p-chloro styrene or 2-vinyl pyridine.

The sulfur dioxide-ethylene-vinyl ester terpolymers with which the stabilizing metal compounds herein are blended can be prepared in any one of several known and conventional ways, e.g., by the procedure described in U.S. Pat. No. 3,684,778 which is incorporated by reference herein. Briefly described, ethylene, sulfur dioxide and a vinyl ester such as vinyl acetate are continuously copolymerized in a jacketed stirred autoclave at a temperature above about 140° C. and at a pressure within the range of 5,000 to 60,000 psi in the presence of a free radical catalyst, the monomers being maintained in proportions such that the resulting terpolymer will consist essentially from at least about 25 percent by weight ethylene, from about 0.1 to 30 percent by weight sulfur dioxide and from about 0.1 to 55 percent by weight of vinyl ester.

The inorganic oxygen-containing metal compounds for incorporation into the sulfur dioxide-ethylene-vinyl ester terpolymers herein can be selected from a large variety of anhydrous and hydrated oxides, carbonates, sulfates, phosphates, borates, silicates, etc., of alkali metals, alkaline earth metals or zinc and can contain one or more other metals in addition to the aforestated. For the purposes of the specification and claims herein, the term "alkaline earth metal" shall include the elements calcium, strontium, barium and magnesium. Examples of such compounds include zinc oxide, magnesium oxide, sodium sulfate, calcium hydroxide, sodium carbonate, zinc carbonate, calcium carbonate, magnesium hydroxide, lithium carbonate, barium hydroxide, barium oxide, barium carbonate, potassium borate, magnesium borate, potassium silicate, potassium carbonate, and the like. If desired, various organic antioxidants can be incorporated in the terpolymers in combination with the inorganic oxygen-containing metal compounds herein. One such combination which has provided especially good results is magnesium oxide and Santonox R which is dialkyl phenol sulfide 4,4'thio-bis (6-t-butyl-m cresol). The amount of inorganic metal compound employed can vary over wide limits and in general will depend upon the amount of sulfur dioxide introduced into the base terpolymers. Good results will often be achieved with the use of from about 0.5 to about 10.0 weight percent inorganic metal compound and when used, from about 0.05 to about 1.0 weight percent organic antioxidant. Preferably, the inorganic metal compound is incorporated in the base terpolymer at from about 1 to about 5 weight percent and the optional organic antioxidant is employed at a level of from about 0.1 to about 0.5 weight percent. Blending of the terpolymer, inorganic metal compound and optional organic antioxidant can be accomplished via conventional techniques such as melt mixing on a two-roll mill, Banbury, etc. Regardless of the method selected, blending should take place under conditions which will provide uniform distribution of the inorganic metal oxide and optional organic antioxidant in the base terpolymer.

In the examples which follow, all percentages are by weight.

EXAMPLE 1

This example illustrates a number of unsuccessful attempts to improve the thermal stability of samples (in the form of pellets) of a sulfur dioxide-ethylene vinyl acetate terpolymer having a very foul odor. The terpolymer contained about 13.5% sulfur dioxide, 67.3% ethylene and 19.2% vinyl acetate. A test panel characterized the odors emitted by the terpolymer as being associated with those of acetic acid, mercaptan, vinyl acetate, burnt wax, fatty acid, aldehyde, sulfurous composition and others not identifiable.

A. Vacuum Drying

The first attempt to solve the odor problem employed vacuum drying for 24 hrs. at 35°–40° C. It was noted that when samples of the terpolymer were exposed to atmospheric air for a number of days there was a slight reduction in odor concentration. However, after being stored in sealed glass jars for a number of days, a very strong odor was again detected in the exposed samples. Vacuum was applied to the samples in an attempt to accelerate the release of the odor to such a degree that it would be eliminated within 24 hrs. The results from this exposure were the same as when samples were exposed to the atmosphere. The vacuum exposure was increased to 96 hrs. with results again being the same as atmospheric exposure.

B. Water Leaching

Water leaching the terpolymer at about 65° C. for one hour was tried with a view to eliminating any malodorous agents which might be water soluble. Samples so treated were air dried for 48 hrs. and thereafter stored in sealed jars for 96 hrs. After this storage period, the odor was compared to an untreated stored sample. The results indicated a slight difference between the two samples.

C. Water Leaching With Aqueous Sodium Hydroxide

The same procedure for the water leaching in B was followed using a 2% aqueous NaOH solution in order to determine whether the presence of alkali metal base would increase the solubilities of the malodorous substances and/or result in their neutralization. Odor evaluation tests were performed on these treated samples following the same procedure as for the water-leached samples, i.e. air drying for 48 hrs. followed by storage in sealed jars for 96 hrs. The results of these odor evaluation tests showed only slight differences compared to the odor of an untreated sample (control).

EXAMPLE 2

In accordance with the present invention, various inorganic oxygen-containing metals and in some cases, organic compounds alone, were incorporated into samples of the terpolymer of Example 1 using a two-roll mill with a temperature of about 100°–110° C. An odor panel evaluated the results both in terms of quantiative impact, e.g., "very slight", "slight", etc., and qualitative impact, e.g., "generally not offensive", "generally offensive", etc. The results were as follows:

| Additive | % Concentration | Odor | Color after 1 hr at 150° C. |
|---|---|---|---|
| ZnO | 0.5 | Very slight to slight; generally not offensive | Light yellow |
| ZnO | 1.0 | Very slight to slight; generally not offensive | Light yellow |
| ZnO | 5.0 | Very slight to slight; generally not offensive | Opaque white |
| MgO | 1.0 | Very slight; generally not offensive | Very light yellow |
| Control | — | Strong; offensive | Dark yellow |
| Control | — | Slight to strong; offensive | Dark brown |
| CaCO$_3$ | 0.5 | Very slight to slight; generally offensive | Medium brown |
| Ca(OH)$_2$ | 0.5 | Very slight to slight; generally offensive | Medium yellow |
| CaCO$_3$/ Ca(OH)$_2$ | 0.25/0.25 | Very slight to slight; offensive | Light brown |
| Na$_2$SO$_3$ | 0.5 | Slight to strong; offensive | Medium brown |

| Additive | % Concentration | Odor | Color after 1 hr at 150° C. |
|---|---|---|---|
| Na$_2$SO$_3$/ CaCO$_3$ | 0.25/0.25 | Slight to strong; offensive | Medium yellow |
| Na$_2$SO$_3$/ Ca(OH)$_2$ | 0.25/0.25 | Slight to strong; offensive | Medium yellow |
| Na$_2$SO$_3$/ Ca(OH)$_2$ | 1/1 | Slight to strong; offensive | Very light yellow |
| Na$_2$CO$_3$ | 0.5 | Slight to strong; offensive | Medium yellow |
| NaHCO$_3$ | 0.5 | Slight to strong; offensive | Medium brown |
| ZnCO$_3$ | 0.5 | Slight to strong; generally offensive | Medium yellow |
| Drapex 6.8 | 0.5[1] | Slight; generally not offensive | Medium yellow |
| Butylated hydroxytoluene | 0.5 | Strong; offensive | Medium brown |
| Santowhite[2] | 0.5 | Very slight to slight; generally not offensive | Dark brown |
| Mark C[3] | 0.5 | Very slight to strong; generally offensive | Medium yellow |
| Mark 235[4] | 0.5 | Very slight to strong; generally offensive | Medium yellow |
| Thermolite 31[5] | 0.5 | Strong; Offensive | Dark brown |

[1]Epoxidized soy bean oil plasticizer (Argus Chemical Co.)
[2]4,4-thiobis(6-tert-butyl-m-cresol) (Monsanto Co.)
[3]Liquid organo phosphite (Argus Chemical Co.)
[4]Barium-cadmium complex soap (Argus Chemical Co.)
[5]An organotin compound of M.&T. Chemicals Inc. of the formula (C$_8$H$_{17}$)$_2$Sn(SCH$_2$COOC$_8$H$_{17}$)$_2$ The inorganic metal compounds gave the best balance between reduced odor and improved color stability compared to the organic compounds. Butylated hydroxytoluene which is disclosed in U.S. Pat. No. 3,684,778 as a stabilizer for sulfur-dioxide-ethylene-vinyl acetate terpolymer gave closest to the poorest result of all.

EXAMPLE 3

Samples of a terpolymer containing 9.3% sulfur dioxide, 71.7% ethylene and 19% vinyl acetate were blended with various metal oxides on a 6×12" Tropp mill for 10 minutes at 100°–110° C. The results were as follows:

| Additive | % Concentration | Odor | Color after 1 hr. at 150° C. |
|---|---|---|---|
| MgO(as a 25% aqueous dispersion) | 1 | Very slight to strong; generally offensive (2 of 3) | Very light yellow |
| MgO(as a 25% aqueous dispersion | 5 | Very slight to strong; generally not offensive (2 of 3) | Very light yellow |
| MgO(powder) | 1 | Slight; generally not offensive (2 of 3) | Very light yellow |
| Al$_2$O$_3$(as a 25% aqueous dispersion) | 1 | Slight to strong; generally offensive (2 of 3) | Medium yellow |
| Al$_2$O$_3$(as a 25% aqueous dispersion) | 5 | Slight to strong; generally offensive (2 of 3) | Very light yellow |
| Al$_2$O$_3$(powder) | 1 | Slight to strong; generally offensive (2 of 3) | Light brown |
| None | — | Strong; offensive | Dark brown |
| Water | 15 | Slight to strong; offensive (2 of 3) | Dark brown |

Adding the oxides as water dispersions gave slightly better color than dry powder after heat aging. However, slight increases in odor were apparent by adding the above oxides as water dispersions. The terpolymer samples modified with alumina gave only slightly better results than the untreated sample.

EXAMPLE 4

The base terpolymers herein are generally unstable when exposed to high temperatures for prolonged periods of time. Mill stability tests conducted on the terpolymers show a continual increase in discoloration from light yellow to black or very dark brown over the duration of milling test up to 180 mins. at 150° C. Melt index data for the milled samples showed a continual drop from an initial 9.45 to 0 after 90 min. milling time for a control sample. Samples of a terpolymer containing 9.0% sulfur dioxide, 72% ethylene and 19% vinyl acetate were blended with 1% MgO, 1% Al$_2$O$_3$ and 1% and 5% ZnO on a two-roll mill at 150° C. An initial sample was removed and thereafter one every 15 minutes during a total period of 180 min. A control sample was subjected to the same conditions. Melt indices were obtained for each sample to determine changes that occurred within the polymer during milling. The results were as follows:

| Time on Mill (min) | Additive | | | | |
|---|---|---|---|---|---|
| | 1% MgO | 1% Al$_2$O$_3$ | 1% ZnO | 5% ZnO | Control |
| | Melt Index | | | | |
| Initial-3 min. | 3.08 | 9.56 | 12.98 | 12.59 | 9.45 |
| 15 | 2.52 | 2.60 | 14.23 | 13.45 | 1.65 |
| 30 | 1.86 | 1.28 | 12.68 | 15.07 | .50 |
| 45 | 1.84 | .50 | 13.07 | 15.35 | .22 |
| 60 | 1.69 | .35 | 10.82 | 17.23 | .12 |
| 90 | 1.40 | .06 | 2.37 | 19.46 | .01 |
| 120 | 1.28 | .01 | 1.11 | 19.75 | .005 |
| 150 | 1.15 | .01 | .15 | 19.40 | .001 |
| 180 | 1.04 | .01 | .20 | 22.76 | 0 |

These data show the addition of 1% ZnO to be the best stabilizer for the period of up to 45 min. At 5% ZnO levels, however, some chain scission occurs. The addition of MgO tended to crosslink the polymer up to 60 min. with a stable condition developing at 90 min. The addition of Al$_2$O$_3$ had little effect compared to the control.

Plaques 1½×½×0.063" were pressed from the samples for all milling times and a color comparison was made. By such comparison, 1% MgO appeared to be the best heat stabilizer for 180 min. at 150° C. Plaques molded from this blend remained clear up to 120 min. with only slight yellowing in the final 60 minutes. The control sample showed increased yellowness after 15 min. and at 120 min., the sample was black. The sample containing Al$_2$O$_3$ showed the same behavior to a somewhat lesser degree with samples taken at 120 min. to 180 min. not turning black. The sample containing 5% ZnO underwent a marked color change only at 180 min. The sample containing 1% ZnO increased in yellowness at 90 min. and above.

EXAMPLE 5

A series of nine samples of a terpolymer containing 12% sulfur dioxide, 71% ethylene and 17% vinyl acetate were blended with Irganox (Ciba-Giegy) which is thiodiethylene bis-(3,5-di-tert-butyl-4hydroxy) hydrocinnamate, MgO, Naugard 445 (Uniroyal) which is a substituted diphenylamine, and Santonox R (Monsanto) on a two-roll Tropp mill for 10 min. at 40°–50° C. The composition of the samples, their oxygen induction times and color development were as follows:

| | Sample No. | | | | | | | | |
|---|---|---|---|---|---|---|---|---|---|
| | 1 | 2 | 3 | 4 | 5 | 6 | 7 | 8 | 9 |
| Terpolymer | 100 | 100 | 100 | 100 | 100 | 100 | 100 | 100 | 100 |
| Irganox 1035 | — | 0.1 | 0.5 | — | — | — | — | — | — |
| MgO | — | — | — | 1 | 5 | — | — | — | — |
| Naugard 445 | — | — | — | — | — | 0.1 | 0.5 | — | — |
| Santonox R | — | — | — | — | — | — | — | 0.1 | 0.5 |
| $O_2$ Induction time at 200° C. (min)* | 0.4 | 0.73 | 20.7 | 0.39 | 0.54 | 1.1 | 20.7 | 4.5 | 19 |
| Color development after 1 hr. at 150° C. | med. yellow | med. bwn. | dk. bwn. | lgt. yellow | lgt. bwn. | dk. bwn. | dk. bwn. | dark brown | dark brown |

*This is the time required for the additive to be consumed at a given temperature. The sample is heated at 200° C. under nitrogen and oxygen is thereafter admitted to the sample cell at 5 ml per minute.

After removal from the mill, the samples were cooled to room temperature, granulated with solid carbon dioxide through a 0.125" screen, dried at room temperature to remove any moisture, placed in sealed glass jars and heated in a forced air oven for one hour at about 50° C. After a cooling period of 30 min., the odor of each sample was evaluated within 15 min. With the sole exception of MgO, none of the above additives lead to a reduction in odor which in fact seemed worse than that of the control (Sample No. 1).

For oven stability after two hours at 150° C. 3 gm of the terpolymer were placed in an alumina weighing dish. Color was checked after removal from the oven. Melt index of the terpolymer was too high for effective mill blending at 105° C. or 150° C. The lower mill temperature probably contributed to a lower odor ranking obtained with some of the above additives indicating the possibility that temperature may have had an effect on volatilization and reaction of the additives with the odor causing agents.

EXAMPLE 6

A number of inorganic metal compounds were blended with samples of the terpolymer of Example 5 and evaluated for thermal stability (as measured by a decrease in odor and an increase in color stability) after two hours at 150° C. The results were as follows:

| Additive | % Concentration | Odor | Color after 2 hr. at 150° C.* |
|---|---|---|---|
| $Li_2CO_3$ | 1 | Strong; offensive | 4 |
| | 5 | Strong; offensive | 9 |
| MgO | 1 | Slight to strong; offensive | 7 |
| | 5 | Slight; not offensive (1 of 2) | 8 |
| $MgCO_3$ | 1 | Strong; offensive | 4 |
| | 5 | Slight to strong; offensive | 6 |
| Mg Absorbant | 1 | Slight; offensive (2 of 3) | 8 |
| | 5 | Slight; not offensive (2 of 3) | 8 |
| $BaCO_3$ | 1 | Strong; offensive | 4 |
| | 5 | Slight to strong; offensive | 4 |
| $Ba(OH)_2$ | 1 | Slight to strong; offensive (2 of 3) | 6 |
| | 5 | Slight to strong; offensive (2 of 3) | 6 |
| $CaCO_3$ | 1 | Slight to strong; offensive (2 of 3) | 4 |
| | 5 | Slight to strong; not offensive (2 of 3) | 6 |
| $Ca(OH)_2$ | 1 | Slight to strong; offensive (2 of 3) | 6 |
| | 5 | Slight to strong; not offensive (2 of 3) | 8 |
| CaO | 1 | Slight to strong; offensive | 4 |
| | 5 | Slight to strong; offensive (2 of 3) | 8 |
| Control | — | Strong; offensive | 1 |
| $KH_2PO_4$ (Potassium phosphate monobasic) | 1 | Strong; offensive | 4 |
| | 5 | Strong; offensive | 6 |
| Diatomaceous silica | 1 | Strong; offensive | 2 |
| | 5 | Strong; offensive | 2 |
| Dibasic lead phosphite | 1 | Strong; offensive | 5 |
| | 5 | Slight; not offensive (2 of 3) | 8 |
| Calcium ricinoleate | 1 | Strong; offensive (2 of 3) | 6 |
| | 5 | Strong; offensive | 5 |
| Staybelite (hydrogenated rosin, Hercules) | 1 | Strong; offensive (2 of 3) | 2 |

*Ranking
10 = best (color of pellets, as received)
1 = worst (dark brown)

Although dibasic lead phosphite gave good results, this compound is considered too toxic to be considered a practical thermal stabilizer for the terpolymers herein.

These data also show the organic materials by themselves to be generally poor stabilizers.

EXAMPLE 7

This example demonstrates the enhanced effectiveness of MgO as a stabilizer for the sulfur dioxide-ethylene-vinyl acetate terpolymer of Example 5 when combined with the antioxidant Santonox R on a two-roll mill for 10 minutes at about 50° C. Four examples were prepared with their properties recorded as follows:

| Sample No. | MgO | Santonox R | $O_2$ Induction time at 200° C. (min.) | Odor | Color development after 2 hrs. at 150° C. |
|---|---|---|---|---|---|
| 1 | — | — | 0.68 | Strong; offensive | Dark brown |
| 2 | 5.0% | — | 0.57 | Slight; not offensive (2 of 3) | Light yellow |
| 3 | — | 0.5% | 45 | Strong; offensive | Dark brown |
| 4 | 5.0% | 0.5% | 176 | Slight; offensive (2 of 3) | Slightly dark yellow |

EXAMPLE 8

The procedure of Example 7 was carried out employing the base terpolymer of Example 4. The observed results were as follows:

| Sample No. | MgO | Santonox R | $O_2$ Induction Time at 200° C. (min.) |
|---|---|---|---|
| 1 | — | — | 0.57 |
| 2 | 5 | — | 0.73 |
| 3 | 5 | 0.5 | 52.6 |
| 4 | — | 0.5 | 8.9 |

| Mill Stability at 150° C.: | 1 | | 2 | | 3 | | 4 | |
|---|---|---|---|---|---|---|---|---|
| | MI$_2$* | Color | MI$_2$ | Color | MI$_2$ | Color | MI$_2$ | Color |
| Initial | 4.7 | lt. yel. | 1.5 | sl. yel. opaque | 2.3 | Sl. yel. opaque | 7.9 | lt. bwn. |
| Aft. 15 min. | 1.7 | | 1.1 | yellow opaque | 1.8 | sl. darker than #2 | 4.6 | brown |
| 30 min. | 1.0 | brown | 1.5 | | 1.8 | | 3.4 | |
| 60 min. | 0.7 | | 1.3 | | 1.8 | | 2.7 | |
| 90 min. | 0.7 | dark brown | 1.5 | | 1.7 | | 1.9 | dk. bwn. |
| 120 min. | 0.5 | | 1.5 | | 1.9 | | 1.1 | |
| 180 min. | 0.5 | dark brown | 2.2 | yellow opaque | 2.5 | sl. darker than #2 | 2.1 | dk. bwn. |

MI$_2$ = melt index

What is claimed is:

1. A sulfur dioxide-ethylene-vinyl ester terpolymer having improved thermal stability observed as a reduction in the level of malador of the terpolymer and/or an improvement in the color stability of the terpolymer, said terpolymer containing substantially uniformly distributed therein a thermal stability imparting amount of at least one inorganic oxygen-containing metal compound in which the metal is an alkali metal, alkaline earth metal or zinc.

2. The terpolymer of claim 1 containing from about 0.5 to about 10.0 weight percent inorganic oxygen-containing metal compound.

3. The terpolymer of claim 2 containing from about 1 to about 5 weight percent inorganic oxygen-containing metal compound.

4. The terpolymer of claim 1 in which the inorganic oxygen-containing metal compound is an oxide, carbonate, sulfate, phosphate, borate or silicate.

5. The terpolymer of claim 4 in which the inorganic oxygen-containing metal compound is at least one member of the group consisting of zinc oxide, magnesium oxide, sodium sulfate, calcium hydroxide, sodium carbonate, zinc carbonate, calcium carbonate, magnesium hydroxide, lithium carbonate, barium hydroxide, barium oxide, barium carbonate, potassium borate, magnesium borate, potassium silicate and potassium carbonate.

6. The terpolymer of claim 1 additionally containing an organic antioxidant.

7. The terpolymer of claim 6 containing from about 0.05 to about 1.0 weight percent organic antioxidant.

8. The terpolymer of claim 7 containing from about 0.1 to about 0.5 weight percent organic antioxidant.

9. The terpolymer of claim 6 in which the organic antioxidant is [dialkyl phenol sulfide 4,4'thio-bis(6-t-butyl-5m-cresol)].

10. The terpolymer of claim 1 containing magnesium oxide in combination with [dialkyl phenol sulfide 4,4'thio-bis (6-t-butyl-m-cresol)].

11. A process for imparting improved thermal stability to a sulfur dioxide-ethylene-vinyl acetate terpolymer observed as a reduction in the level of malodor of the terpolymer and/or an improvement in the color stability of the terpolymer which comprises incorporating substantially uniformly in said terpolymer a thermal stability-imparting amount of at least one inorganic oxygen-containing metal compound in which the metal is an alkali metal, alkaline earth metal or zinc.

12. The process of claim 11 in which is added from about 0.5 to about 10.0 weight percent inorganic oxygen-containing metal compound.

13. The process of claim 12 in which is added from about 1 to about 5 weight percent inorganic oxygen-containing metal compound.

14. The process of claim 11 in which the inorganic oxygen-containing metal compound is an oxide, carbonate, sulfate, phosphate, borate or silicate.

15. The process of claim 14 in which the inorganic oxygen-containing metal compound is at least one member of the group consisting of zinc oxide, magnesium oxide, sodium sulfate, calcium hydroxide, sodium carbonate, zinc carbonate, calcium carbonate, magnesium hydroxide, lithium carbonate, barium hydroxide, barium oxide, barium carbonate, potassium borate, magnesium borate, potassium silicate and potassium carbonate.

16. The process of claim 11 in which is additionally added an organic antioxidant.

17. The process of claim 16 in which is added from about 0.05 to about 1.0 weight percent organic antioxidant.

18. The process of claim 17 in which is added from about 0.1 to about 0.5 weight percent organic antioxidant.

19. The process of claim 16 in which the organic antioxidant is [dialkyl phenol sulfide 4,4'thio-bis(6-t-butyl-m-cresol)].

20. The process of claim 11 in which is added magnesium oxide in combination with [dialkyl phenol sulfide 4,4'thio-bis(6-t-butyl-m-cresol)].

* * * * *